United States Patent
Dwyer

(10) Patent No.: US 7,761,195 B2
(45) Date of Patent: Jul. 20, 2010

(54) SYSTEM AND METHOD FOR SELECTIVE DISPLAY OF A STANDBY ATTITUDE INDICATOR AND AN AIRPORT MAP DATA USING THE SAME DISPLAY

(75) Inventor: David B. Dwyer, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 758 days.

(21) Appl. No.: 11/699,240

(22) Filed: Jan. 29, 2007

(65) Prior Publication Data

US 2009/0089324 A1  Apr. 2, 2009

(51) Int. Cl.
*G06F 17/00* (2006.01)
(52) U.S. Cl. .......................................... 701/3
(58) Field of Classification Search ................ 701/3–4, 701/11, 14–16; 340/945, 961, 963; 342/29, 342/33
See application file for complete search history.

(56) References Cited

U.S. PATENT DOCUMENTS

| 5,978,715 | A | * | 11/1999 | Briffe et al. ................... 701/11 |
| 6,049,754 | A | * | 4/2000 | Beaton et al. ............... 701/204 |
| 7,079,951 | B2 | | 7/2006 | Conner et al. |
| 7,117,089 | B2 | | 10/2006 | Khatwa et al. |

* cited by examiner

*Primary Examiner*—Yonel Beaulieu
(74) *Attorney, Agent, or Firm*—Ingrassia Fisher & Lorenz, P.C.

(57) ABSTRACT

Methods and apparatus are provided for selectively rendering a standby attitude indicator or an airport map on an aircraft display. The system determines whether the aircraft is on the ground or in flight and, based on this determination, either the standby attitude indicator or the airport map are rendered on the display. If the aircraft is determined to be in flight, then the standby attitude indicator is rendered. Conversely, if the aircraft is determined to be on the ground, then either the standby attitude indicator or the airport map is selectively rendered.

20 Claims, 3 Drawing Sheets

SYSTEM AND METHOD FOR SELECTIVE DISPLAY OF A STANDBY ATTITUDE INDICATOR AND AN AIRPORT MAP DATA USING THE SAME DISPLAY

TECHNICAL FIELD

The present invention generally relates to an aircraft systems and methods and, more particularly, to a system and method for selectively displaying a standby attitude indicator and airport map data using the same display.

BACKGROUND

Air traffic, both private and commercial, continues to increase. With this increase, there has been a concomitant increase in the likelihood of runway incursions. Efforts are thus being made to increase aircraft flight crew awareness during ground operations. As part of this effort, various systems have been developed that, among other functions, provide aural alerts to an aircraft flight crew when the aircraft approaches a runway. Although quite useful in increasing flight crew awareness, it does not provide visual situational awareness to the flight crew.

In an effort to improve aural-only systems, a system that combines both visual and aural awareness during ground operations has been developed. This system allows for the generation of airport maps on multi-function displays (MFDs). Although quite useful for modern aircraft, this system may not be practical for use in aircraft that do not already include one or more MFDs, since retrofitting aircraft with MFDs can be space and/or cost prohibitive.

Accordingly, there is a need for a system and method of displaying airport maps in an aircraft without having to retrofit the aircraft with new and/or additional displays. The present invention addresses at least this need. Furthermore, other desirable features and characteristics of the present invention will become apparent from the subsequent detailed description and the appended claims, taken in conjunction with the accompanying drawings and this background.

BRIEF SUMMARY

In one embodiment, and by way of example only, a display system for an aircraft includes a display device and a processor. The processor is adapted to receive data representative of aircraft flight status and is operable, in response thereto, to determine whether the aircraft is on the ground or in flight. The processor is further operable to command the display device to render a standby attitude indicator if the aircraft is in flight, and render either the standby attitude indicator or at least a portion of an airport map if the aircraft is on the ground.

In another exemplary embodiment, a method of rendering information on a display in an aircraft includes determining whether the aircraft is on the ground or in flight. A standby attitude indicator is rendered on the display if the aircraft is determined to be in flight, and either the standby attitude indicator or at least a portion of an airport map is selectively rendered on the display if the aircraft is determined to be on the ground.

BRIEF DESCRIPTION OF THE DRAWINGS

The present invention will hereinafter be described in conjunction with the following drawing figures, wherein like numerals denote like elements, and wherein.

DETAILED DESCRIPTION OF A PREFERRED EMBODIMENT

Figure 1:
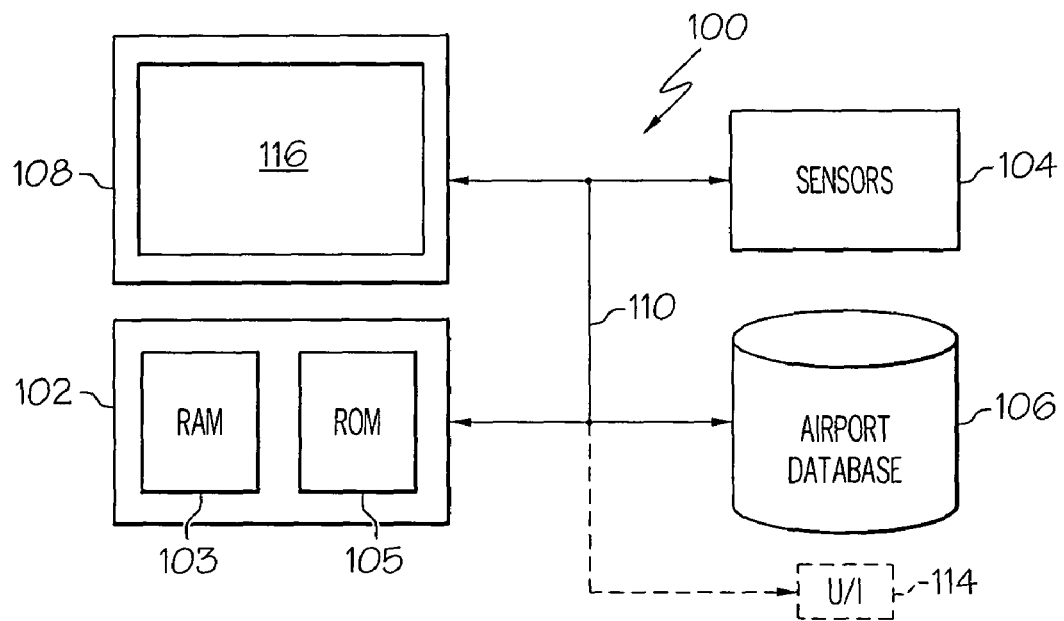
FIG. 1 is a functional block diagram of a portion of a flight deck display system according to one embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. In this regard, the present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed. It should be appreciated that the particular implementations shown and described herein are illustrative of the invention and its best mode and are not intended to otherwise limit the scope of the invention in any way.

Turning now to FIG. 1, a portion of an exemplary flight deck display system 100 is depicted and includes at least a processor 102, various sensors 104, one or more airport map databases 106, and a display device 108. The processor 102 may be any one of numerous known general-purpose microprocessors or an application specific processor that operates in response to program instructions. In the depicted embodiment, the processor 102 includes on-board RAM (random access memory) 103, and on-board ROM (read only memory) 105. The program instructions that control the processor 102 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 102 may be implemented using various other circuits, not just a programmable processor. For example, digital logic circuits and analog signal processing circuits could also be used.

No matter how the processor 102 is specifically implemented, it is in operable communication with the various sensors 104, the airport database 106, and the display device 108 via, for example, a communication bus 110. The processor 102 is coupled to receive various types of inertial data from one or more of the sensors 104 and is operable, among other things, to determine whether the aircraft is in flight or on the ground. The processor 102 is further operable, based on this determination, to command the display device 108 to render various images. As will be described in more detail further below, the various images include a standby attitude indicator and various airport maps (or at least portions thereof). Though not shown in FIG. 1, it will be appreciated that the processor 102 may additionally be coupled to receive various data from one or more other external systems. For example, the processor 102 may also be in operable communication with a source of weather data, a terrain avoidance and warning system (TAWS), a traffic and collision avoidance system (TCAS), an instrument landing system (ILS), and a runway awareness and advisory system (RAAS), just to name a few.

The various sensors 104 may be implemented using various types of inertial sensors, systems, and or subsystems 112, now known or developed in the future, for supplying various types of inertial data. The inertial data may also vary, but preferably include data representative of aircraft flight status such as, for example, aircraft speed, heading, altitude, attitude, and may additionally include data from one or more weight-on-wheel (WOW) sensors.

The airport database 106 includes airport map data representative of at least portions of one or more airport maps. The specific airport map data may vary and may include, for example, data representative of fixed airport obstacles (towers, buildings, and hangars), various data representative of various aircraft pathways (e.g., taxiways, runways, apron elements, etc.), data representative of various airport identifiers, data representative of various aircraft pathway identifiers, data representative of various aircraft pathway width and length values, data representative of the position and attitude of various aircraft pathways, various aircraft pathway survey data, including runway and taxiway center point, runway and taxiway centerline, and runway and taxiway endpoints, just to name a few. It will be appreciated that, although the airport database 106 is, for clarity and convenience, shown as being stored separate from the processor 102, all or portions of the database 106 could be loaded into the on-board RAM 103, or integrally formed as part of the processor 102, and/or RAM 103, and/or ROM 105. The airport database 106, or data forming portions thereof, could also be part of one or more devices or systems that are physically separate from the display system 100.

Before proceeding further it is noted that an optional user interface 114 is depicted in phantom in FIG. 1. The user interface 114, if included, is in operable communication with the processor 102 and is configured to receive input from a user (e.g., a pilot) and, in response to the user input, supply display selection signals to the processor 102. The user interface 114 may be any one, or combination, of various known user interface devices including, but not limited to, one or more buttons, switches, or knobs, or a cursor control device (CCD), such as a mouse, a trackball, or joystick, and/or a keyboard. No matter the how it is specifically implemented, the user interface 114 is configured to receive stimuli (referred to herein as display selection input) from the user. In response to the received stimuli, the user interface 114 supplies display selection signals to the processor 102. Although the user interface 114 may be configured to supply any number of display selection signals, it is preferably configured to supply at least a first display selection signal and a second display selection signal. No matter the particular number of display selection signals supplied, and as will be described in more detail further below, the processor 102 is at least selectively responsive to the display selection signals supplied from the user interface 114.

Figure 2:
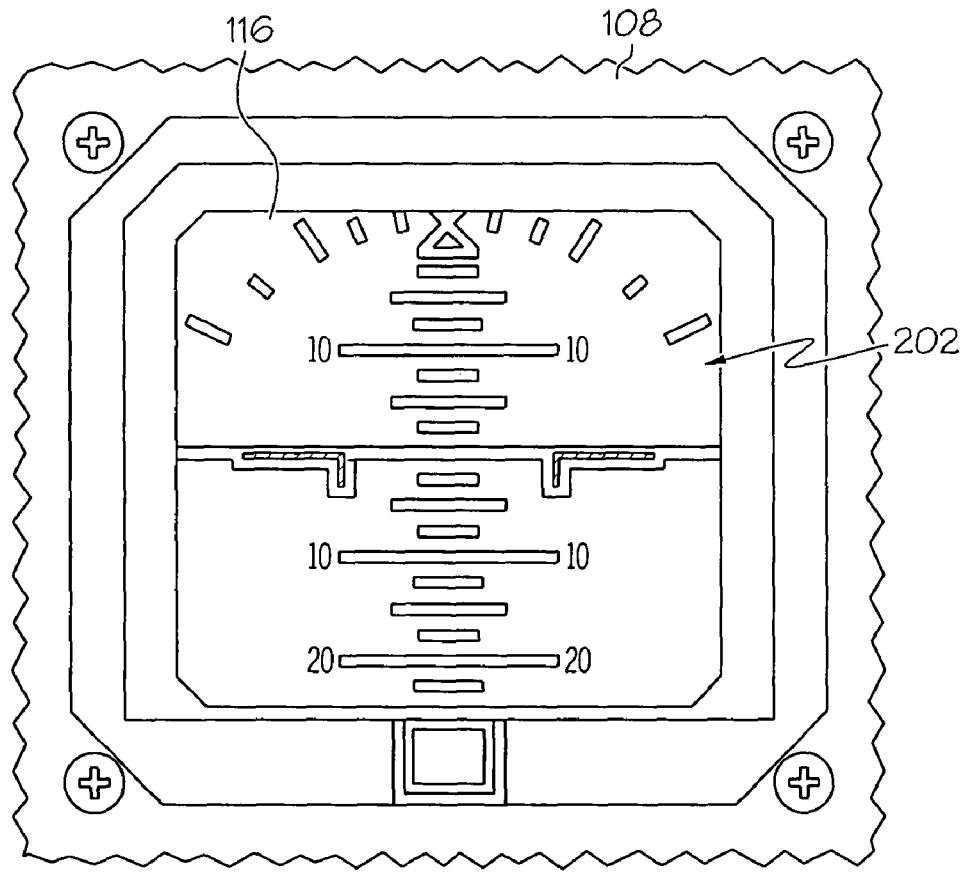
FIG. 2 depicts an exemplary display that may be used in the of the system of FIG. 1 rendering a standby attitude indicator.

The display device 108 includes a display 116 on which various images and data, in both a graphical and a textual format, are rendered. It will be appreciated that the display 116 may be any one of numerous known displays suitable for rendering image and/or text data in a format viewable by a user. Non-limiting examples of such displays 116 include various cathode ray tube (CRT) displays, and various flat panel displays such as, various types of LCD (liquid crystal display), and TFT (thin film transistor) displays. The display device 108 may additionally be implemented as a panel mounted display, a HUD (head-up display) projection, or any one of numerous known technologies. Preferably, however, the display device 108 is implemented as a suitable panel mounted display, such as a standard 3-inch or 4-inch air transport indicator. No matter how it is specifically implemented, the display device 108, as was previously noted, is commanded by the processor 102 to render on the display 116 either a standby attitude indicator or at least portions of an airport map. An exemplary standby attitude indicator 202 that may be rendered on the display 116 is depicted in FIG. 2. The rendered standby attitude indicator 202 is preferably configured in a conventional manner, and will thus not be further described. An exemplary airport map 302 that may be rendered on the display 116 is depicted in FIG. 3 and, for completeness, will now be briefly described.

Figure 3:
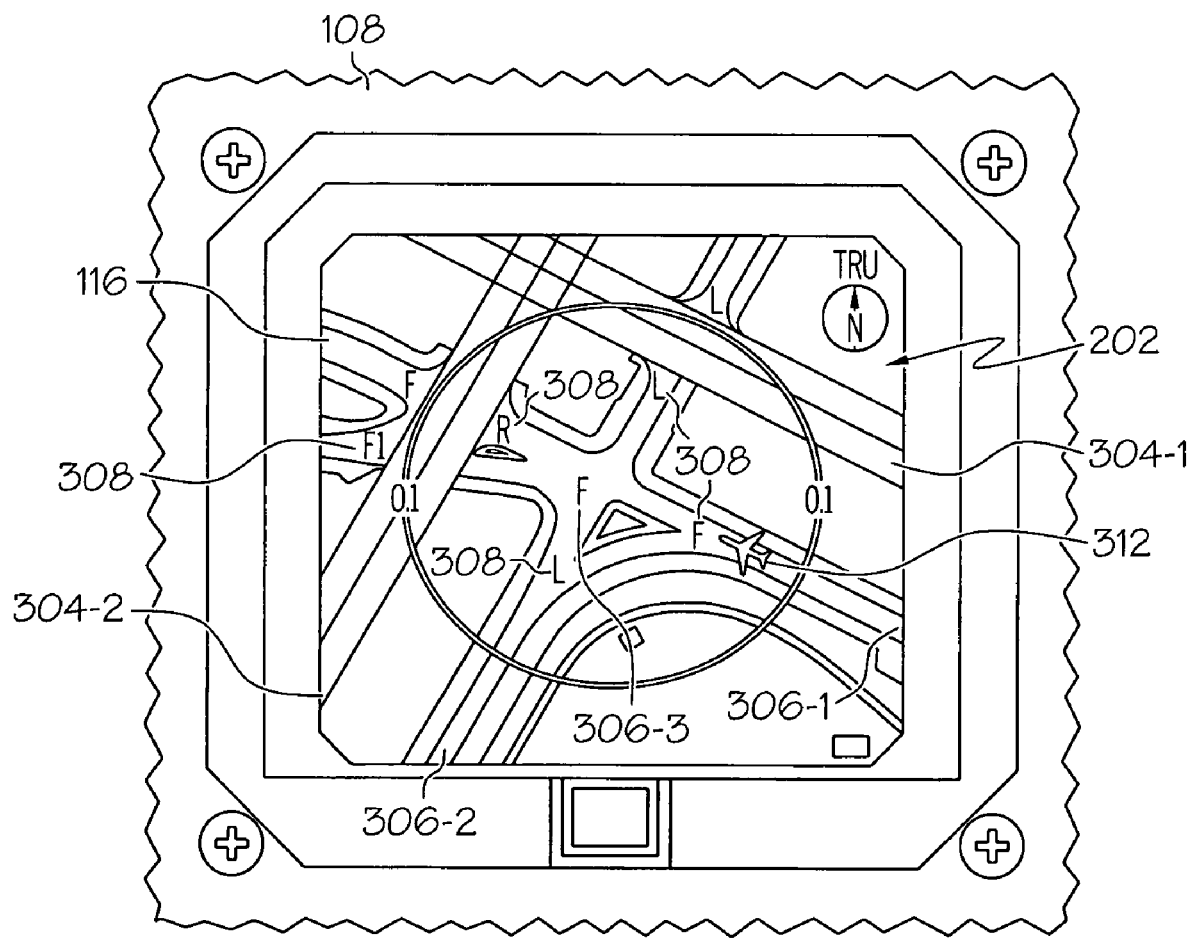
FIG. 3 depicts an exemplary display that may be used in the system of FIG. 1 rendering a lateral situation view of an airport map.

With reference to FIG. 3, it is seen that when the display device 108 is rendering the airport map 302, it is preferably rendered as a two-dimensional lateral situation view. It will be appreciated, however, that the processor 102 could be configured to command the display device 112 to render a perspective view of at least portions of the airport map 302. No matter the particular type of view that is rendered, the airport map 302 typically includes various aircraft pathways, which may include one or more runways 304 (e.g., 304-1, 304-2), one or more taxiways 306 (e.g., 306-1, 306-2, 306-3), various other runway displaced airport features such as, for example, one or more non-illustrated apron elements, and various airport structures such as, for example, terminal buildings and air traffic control towers. In addition to rendering a lateral (or perspective) situation view of the physical layout of the airport, the processor 102 may also be command the display 108 to render the identifiers associated with at least some of the rendered aircraft pathways. For example, in the embodiment depicted in FIG. 3, identifiers 308 are rendered on the surfaces of the aircraft pathways 304, 306.

It will be appreciated that the system 100 could implement various methodologies to render the airport map 302. Some non-limiting exemplary methodologies are disclosed in U.S. patent application Ser. No. 11/502,654, entitled "Taxiway Awareness and Advisory System," which was filed Aug. 11, 2006, and is assigned to the assignee of the instant application, and in U.S. Pat. Nos. 6,606,563, 6,983,206, 7,079,951, and 7,117,089, all of which are also assigned to the assignee of the instant application.

In addition to commanding the display device 108 to render an airport map 302, the processor 102 may also command the display device 108 to render the position of the aircraft on the airport map. For example, the processor 102 may receive data representative of the position of the aircraft from one or more of the sensors 104 and, using these data, determine the position of the aircraft. The processor 102 may then command the display device 108 to render the position of the aircraft either textually or, as depicted in FIG. 3, as an icon 312 at a location representative of the determined aircraft position.

Figure 4:
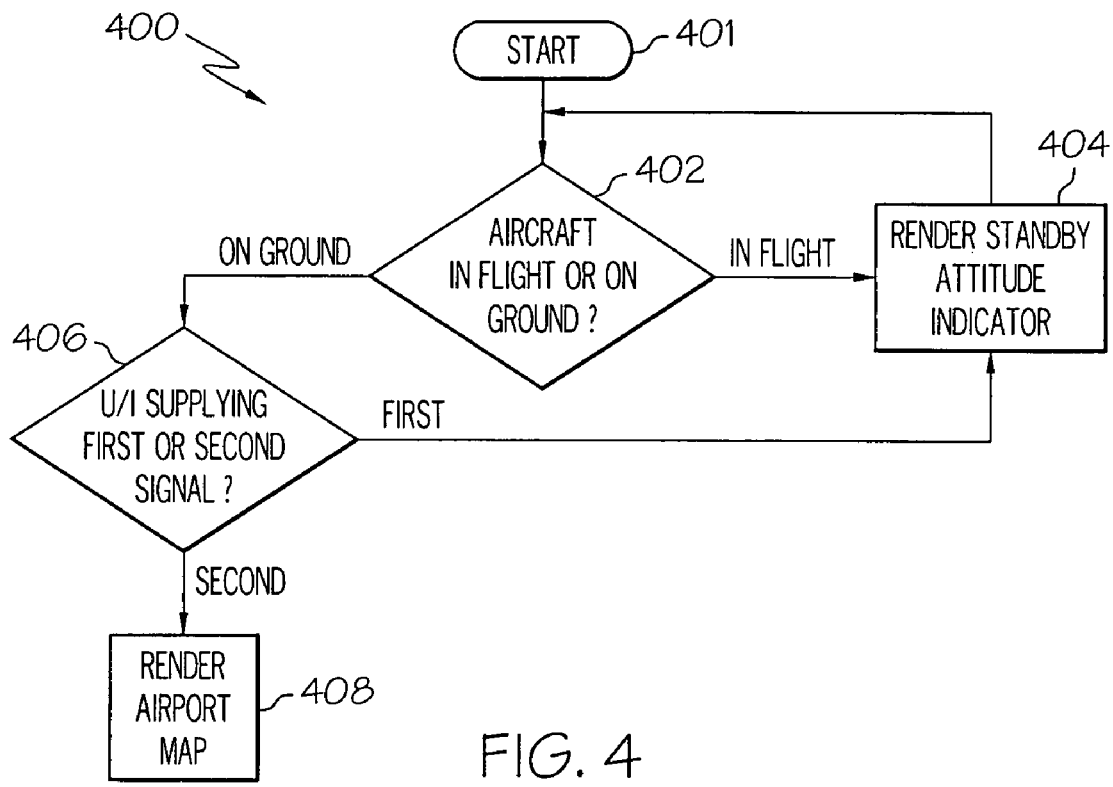
FIG. 4 is a flowchart depicting an exemplary process that may be implemented by the system of FIG. 1 for selectively rendering either a standby attitude indicator or an airport map.

Turning now to FIG. 4, an exemplary method implemented by the system 100 to selectively render the standby attitude indicator 202 or the airport map 302 on the display device 108 will now be described. In doing so, reference should be made to FIG. 4, which depicts the exemplary method 400 in flowchart form, in combination with FIGS. 1-3 as needed or desired. It should additionally be noted that the parenthetical references Whenever an aircraft is in flight, it is preferable that a standby attitude indicator is provided, in one manner or another, to the flight crew. Conversely, when the aircraft is on the ground it is preferably that a map of the airport at which the aircraft is located at least be available for display to the flight crew. It is thus seen that the system 100 initially determines whether the aircraft is in flight or on the ground (402). Although the system 100 may make this determination using any one of numerous techniques, it was noted above that the processor 102 is preferably operable, in response to the data representative of aircraft flight status that are supplied from one or more of the various sensors 104, to make this determination. In any case, if the aircraft is determined to be in flight then the processor 102 commands the display device 108 to render the standby attitude indicator 202 (404). Conversely, and as will now be discussed, if the aircraft is determined to be on the ground, then the processor 102 commands the display device 108 to render either the standby attitude indicator 202 or at least a portion of the airport map 302.

In the depicted implementation, the particular image that the processor 104 commands the display device 108 to render when the aircraft is on the ground is based on the display selection signals supplied from the user interface 114 (406). More specifically, if the user interface 114 is supplying the first display selection signal, then the processor 102 commands the display device 108 to render the standby attitude indicator 202 (404). If, however, the user interface 114 is supplying the second display selection signal, then the processor 102 commands the display device 108 to render the airport map 302 (or at least a portion thereof) (408).

In addition to the above it is noted that the process 400 depicted in FIG. 4 results in the processor 102 automatically and continuously commanding the display device 108 to render the standby attitude indicator 202 whenever the aircraft is in flight. More specifically, if the user interface 114 is supplying the second display selection signal and thus the display device 108 is rendering the airport map 302 during, for example, aircraft take-off roll, upon subsequent aircraft take-off the processor 102 will automatically command the display device 108 to render the standby attitude indicator 202. This will occur regardless of the display selection signal being supplied from the user interface 114.

Figure 5:
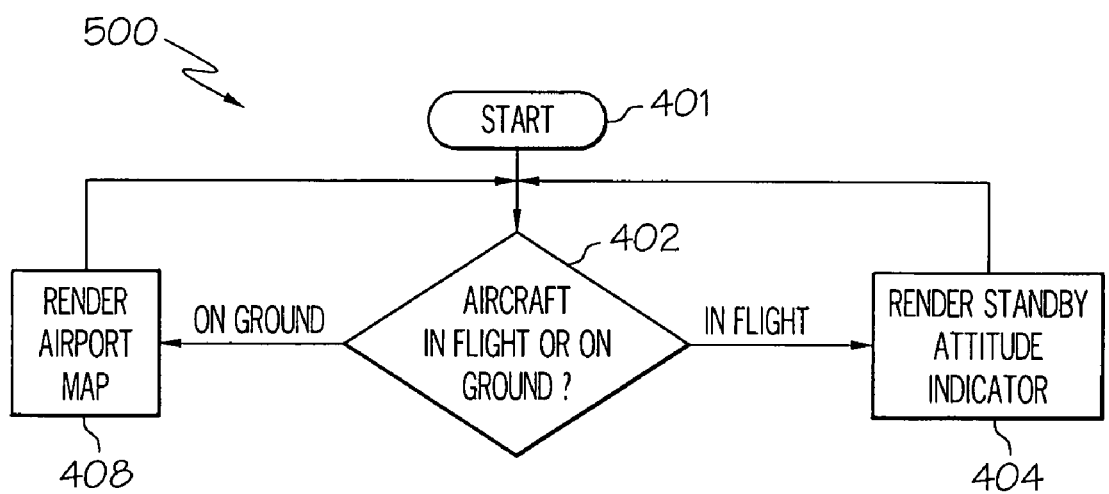
FIG. 5 is a flowchart depicting an alternative exemplary process that may be implemented by the system of FIG. 1 for selectively rendering either a standby attitude indicator or an airport map.

It was noted above that the system 100 could, in some embodiments, be implemented without the user interface 114. If so, the system 100 preferably implements a process 500 such as the one depicted in FIG. 5. This process 500 is substantially similar to the process 400 of FIG. 4; however, instead of rendering either the standby attitude indicator 202 or the airport map 302 when the aircraft is on the ground, the processor 102 automatically and continuously commands the display device 108 to render the airport map 302.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for an aircraft, comprising:
   a display device; and
   a processor in operable communication with the display device, the processor adapted to receive data representative of aircraft flight status and configured, in response thereto, to determine whether the aircraft is on the ground or in flight, and further configured to command the display device to:
   (i) render only a standby attitude indicator if the aircraft is in flight, and
   (ii) render either only the standby attitude indicator or at least a portion of an airport map and not the standby attitude indicator if the aircraft is on the ground.

2. The display device of claim 1, wherein the processor automatically commands the display device to render only the standby attitude indicator if the aircraft is in flight.

3. The display system of claim 1, further comprising:
   a user interface coupled to the processor and configured to receive display selection input from a user and to supply display selection signals,
   wherein the processor is at least selectively responsive to the display selection signals supplied from the user interface to command the display to render either only the standby attitude indicator or at least a portion of the airport map and not the standby attitude indicator.

4. The display system of claim 3, wherein the processor commands the display device to render:
   only the standby attitude indicator if the user interface supplies a first display selection signal and the aircraft is on the ground, and
   at least a portion of the airport map and not the standby attitude indicator if the user interface supplies a second display selection signal and the aircraft is on the ground.

5. The display system of claim 3, wherein the processor commands the display device to render only the standby attitude indicator, regardless of the display selection signal supplied thereto, if the aircraft is in flight.

6. The display system of claim 1, further comprising:
   an airport database in operable communication with the processor, the airport database having airport map data stored therein that are representative of at least portions of one or more airport maps.

7. The display system of claim 6, wherein the processor is further configured to selectively retrieve airport map data from the airport database.

8. The display system of claim 6, wherein:
   the processor is further adapted to receive data representative of the position of the aircraft; and
   the processor is further configured to command the display device to render the position of the aircraft while rendering at least a portion of the airport map.

9. The system of claim 8, wherein the processor is further configured to command the display device to render the position of the aircraft textually.

10. The system of claim 8, wherein the processor is further configured to command the display device to render the position of the aircraft as an aircraft icon at a location representative of the determined present position.

11. A method of rendering information on a display in an aircraft, the method comprising the steps of:
determining whether the aircraft is on the ground or in flight;
rendering only a standby attitude indicator on the display if the aircraft is determined to be in flight; and
selectively rendering either only the standby attitude indicator or at least a portion of an airport map and not the standby attitude indicator on the display if the aircraft is determined to be on the ground.

12. The method of claim 11, further comprising:
automatically rendering only the standby attitude indicator on the display when the aircraft transitions from being on the ground to being in flight.

13. The method of claim 11, further comprising:
determining whether a user interface is supply a first display selection signal or a second display selection signal; and
rendering either only the standby attitude indicator or at least a portion of the airport map and not the standby attitude indicator on the display, based at least partially on the supplied display selection signal.

14. The method of claim 13, further comprising:
rendering the only standby attitude indicator on the display if the user interface is supplying the first display selection signal and the aircraft is on the ground, and
rendering at least a portion of the airport map and not the standby attitude indicator on the display if the user interface is supplying the second display selection signal and the aircraft is on the ground.

15. The method of claim 13, further comprising:
rendering only the standby attitude indicator on the display, regardless of the supplied delay selection signal, if the aircraft is in flight.

16. The method of claim 11, further comprising:
storing airport map data that are representative of at least portions of one or more airport maps in an airport database.

17. The method of claim 16, further comprising:
selectively retrieving airport map data from the airport database.

18. The method of claim 16, further comprising:
determining the position of the aircraft; and
simultaneously rendering the position of the aircraft on the display whenever at least a portion of the airport map is rendered on the display.

19. The method of claim 18, wherein the position of the aircraft is rendered on the display textually.

20. The method of claim 18, wherein the position of the aircraft is rendered on the display as an aircraft icon at a location representative of the determined present position.

* * * * *